Nov. 18, 1941. C. H. WHITE Re. 21,949
PLANTER
Original Filed Aug. 29, 1927 2 Sheets-Sheet 1
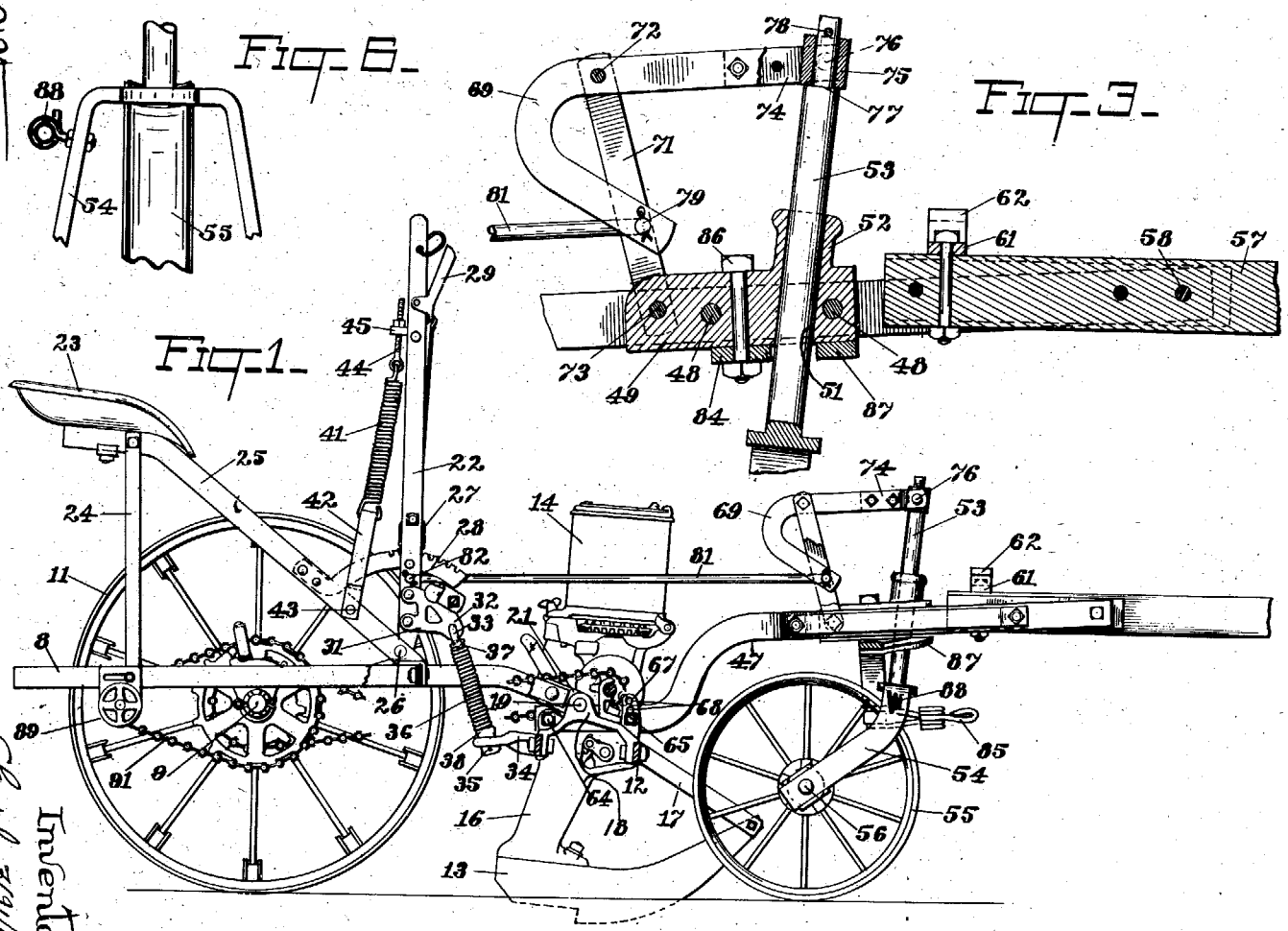
Witness
Milton Lonoir
Inventor
Charles H. White
By John L. Jackson
Attorney Nov. 18, 1941. C. H. WHITE Re. 21,949
PLANTER
Original Filed Aug. 29, 1927 2 Sheets-Sheet 2
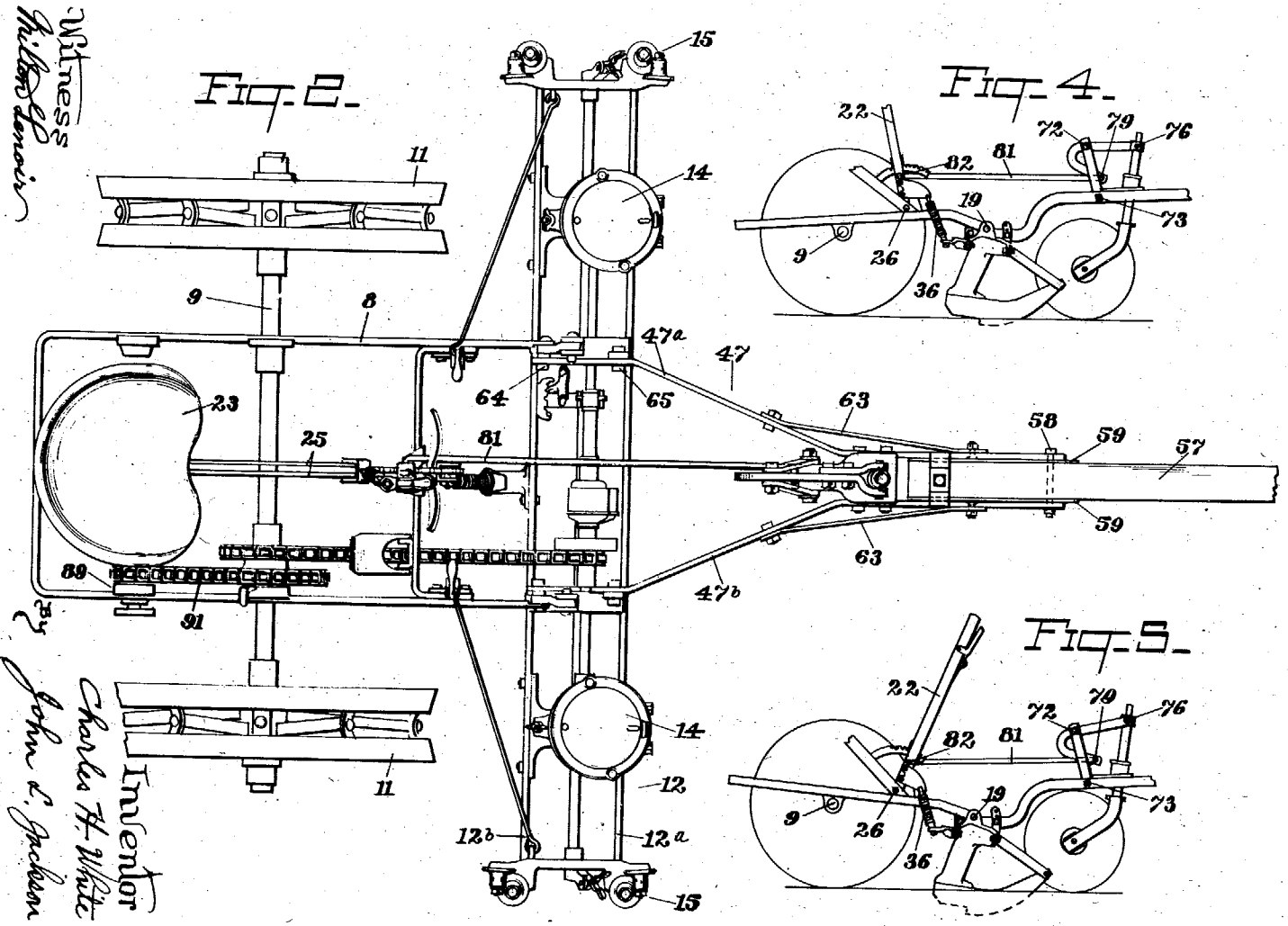
Witness
Milton Lenoir
Inventor
Charles H. White
By John C. Jackson
Attorney Reissued Nov. 18, 1941 Re. 21,949

UNITED STATES PATENT OFFICE 21,949

PLANTER

Charles H. White, Moline, Ill., assignor to Deere & Company, Moline, Ill., a corporation of Illinois Original No. 1,807,814, dated June 2, 1931, Serial No. 216,083, August 29, 1927. Application for reissue July 31, 1941, Serial No. 404,949

27 Claims. (Cl. 111—56)

My invention relates to planters and has particular reference to improvements in implements of the corn planter type. Such type of planting implement usually comprises a two-wheeled sulky frame on which the runners, runner frame, seed hoppers and check mechanism, are all supported forwardly of the transverse axis of the wheels. In implements of this general description, the combined weight of the runners, runner frames, etc., tends to tilt the front end of the implement downwardly around the transverse axis of the wheels, and this transmits a considerable neck yoke weight to the front end of the draft tongue. When the furrow openers are engaging in the ground some portion of this tilting weight is borne directly by the furrow openers, but a considerable part of such tilting weight is nevertheless transmitted to the end of the tongue, as neck yoke weight to be carried by the team. Obviously, when the furrow openers are lifted from the ground, as in turning at the ends of the field, or in transporting the implement to or from the field, all of such tilting weight must be carried by the team through the neck yoke. Moreover, when attachments are added to the implement for distributing fertilizer or for sowing pea or bean seed, etc., this neck-yoke weight is considerably increased.

Another difficulty encountered in this general type of planting implement is that the accuracy of the planting operation is affected by variations in the hitched height of the outer end of the tongue and by the rise and fall of this outer end in the travel of the implement. For example, in order to secure proper positioning of the runners for accurate check-row planting, it is necessary that the tongue be adjusted for horses of different heights. Moreover, the rise and fall of the outer ends of the pole, incident to the travel of the team over abrupt variations in the surface of the ground, will raise or lower the furrow openers relative to the surface of the ground, with the result that the seed is often planted either too deep or too shallow.

In avoiding these difficulties I have provided a forecarriage or wheeled frame for the front end of the implement, which carries all of the tilting weight above described, and which prevents the proper setting of the runners from being influenced by the angularity of the tongue. One of the principal features of the invention pertains to the manner in which I connect this forecarriage to the frame of the planter and to the manner in which I obtain the vertical adjustments of the runners. In making vertical adjustments of the runners through their normal working range, i. e., through their furrow opening range, it is desirable that the runners be raised and lowered through an approximately rectilinear path, with each runner and its shank remaining in approximately the same angular relation to the surface of the ground in every adjustment. Any pronounced rocking or swinging movement of the runners at this time is objectionable, particularly in check-row planting, where such angular movement tends to destroy the desired registry between the button on the checkwire and the point of deposit of the seed in the furrow. This desired adjusting movement of the runners through an approximately rectilinear path is obtained in the present construction by pivotally connecting the wheeled front frame to the planter frame for relative hinge movement there-between, and by causing the front frame to move up and down bodily with respect to its wheeled support in making adjustments of the runners, the movement of the latter following the movement of the front frame.

The invention also includes other features of improvement pertaining to the detail construction of the forecarriage or wheeled front frame, which features will appear from the following description of a preferred embodiment of the invention. In the drawings illustrating such embodiment:

Figure 1 is a side elevational view of the present planter, the adjacent side portion thereof being broken away to illustrate different operating parts.

Figure 2 is a plan view of the implement.

Figure 3 is a longitudinal sectional view on a larger scale through the upper portion of the forecarriage.

Figures 4 and 5 are diagrammatic views, schematically illustrating the positions of the frames and of the pivots when the runners are at a shallow furrow-opening depth and at a deep furrow-opening depth, respectively, and Figure 6 is a fragmentary elevational view showing one of the check-wire guides on the caster-wheel yoke.

Referring to Figures 1 and 2, 8 indicates the usual frame of the conventional type of planter above referred to. In the present construction of three-wheel implement, such frame corresponds to what may be termed the rear or back frame thereof. The frame 8 is usually provided with a transversely extending axle 9 on which are journaled the wheels 11, the frame 8 being tiltable about the axis of these wheels. Extending transversely of the frame 8 is a runner frame 12 on which is supported the runners 13, the seed hoppers 14, the check-wire heads 15, and the different associated driving mechanisms which serve to govern the feed of the seed from the hoppers 14, and the checked discharge of the seed into the seed furrows. All of such mechanism concerned with the feeding and dropping of the seed is well known, and it is not necessary to describe the same here.

The runner frame 12 comprises two parallel frame bars 12a and 12b to which the shank members 16 of the runners 13 are suitably secured. Thus the angle of the runners 13 as well as their vertical positions are dependent upon the position of the runner frame 12. The upwardly curved front end of each runner is usually braced to the frame 12 through brace bars 17. In the prior type of implement to which I have referred, the runner frame 12 has pivotal connection with the main frame 8, and this same construction is employed in the present implement, such pivotal connection consisting of yoke members 18 which are rigidly secured to the frame bars 12a and 12b and to which the main frame 8 is pivotally connected at 19. The front ends of the side bars of the main frame 8 have pivot lugs 21 rigidly secured thereto, through which pass the pivot pins or bolts 19.

The operation of raising and lowering the runners 13 is performed through an adjusting lever 22 which is usually located in front of the operator's seat 23. The seat 23 is supported on bars 24 and 25 rising from the main frame 8, which are usually arranged to position the seat in rear of a vertical plane passing through the tilting axis 9 of the frame. The lever 22 is pivoted either to one of the supporting bars 25, or to the main frame 8, as indicated by the pivot 26, and such lever carries the usual latching dog 29 adapted to engage in a notched quadrant 28, the latching dog being releasable through the usual latch-release lever 29. A bracket 31 projecting forwardly from the lower part of the lever 22 has pivotal connection at 32 with an operating link 33. The latter extends downwardly through an apertured arm or bracket 34 projecting rearwardly from the runner frame, where such link is provided with a nut or stop collar 35 adapted to engage the underside of the arm or bracket 34. A heavy compression spring 36 is confined on the link 33, between a shoulder 37 on the upper end thereof, and a washer 38 which bears against the upper side of the bracket arm 34. It will be seen that the link 33 is effective to exert a positive upward pull on the runner frame when the lever 22 is pulled backwardly. On the other hand. when the lever 22 is pushed forwardly, the link 33 is free to move downwardly through the opening in the bracket arm 34, so that if the runners are incapable of entering the ground as the lever is being pushed forwardly, the spring 36 will be compressed, until, through forward travel of the implement, the runners have had opportunity to move down to the desired depth adjustment when the pressure of the spring will force the bracket arm 34 down against the adjusted position of the stop 35, as determined by the setting of the lever 22.

A heavy tension spring 41 has its lower end connected to a strap 42 which is pivotally connected at 43 to the bar 25, and the upper end of the spring is connected to an eye-bolt 44 having adjustable mounting in a threaded lug 45 projecting rearwardly from the handle 22. The tension of this spring normally tends to pull the depth adjusting lever rearwardly and thus tends to counter-balance the weight of the runners, runner frame, etc., for facilitating the operation of adjusting the position of the runners.

The foregoing represents in general the typical construction of the planter to which I have referred. In such type of planter the steering tongue or pole is usually connected directly in rigid relation to the runner frame, and it will be evident that with this arrangement the tilting weight of the planter runners and planter mechanism is transmitted directly to the tongue; also that with a given depth adjustment of the runners, any rise or fall of the outer end of the tongue will cause the runners to rise or fall in their depth adjustment in the ground.

The truck or forecarriage which I employ for obviating these objections comprises a frame 47 preferably constructed of two laterally spaced frame bars 47a and 47b. As shown in Figure 2, the front ends of such frame bars are shaped to extend substantially parallel to each other, and rigidly secured between such parallel portions, as by the bolts or rivets 48, is a bearing block 49. The latter is provided with a guide bore 51 extending upwardly therethrough, this guide bore being preferably inclined slightly to the vertical. A boss 52 projecting upwardly from the block 49 increases the effective length of the guide bore. Rotatably and slidably supported in such bore is a wheel standard 53. The lower end of the standard carries a yoke 54 which is inclined rearwardly and downwardly, and which has a wheel 55 rotatably supported on a suitable axle 56 extending between the ends of the yoke arms. By virtue of the swivel mounting of the standard 53 in the guide block 49, the wheel 55 functions as a caster wheel adapted to swing freely to one side or the other in the steering movement of the implement.

The parallel portions of the side bars 47a and 47b extend forwardly beyond the guide block 49 to provide a mounting for receiving the tongue 57. A pivot pin or bolt 58 extends transversely through the frame bars and through the tongue, the tongue having vertical pivotal movement relative to the frame 47 around the axis of this bolt 58. The latter is preferably located adjacent to the front ends of the frame bars, with a considerable portion of the tongue extending rearwardly therefrom between the frame bars for properly guiding the tongue in the frame against lateral movement. Wear plates 59 are suitably secured to the outer sides of the tongue for engaging with the sides of the frame bars 47a and 47b. A U-shaped bracket 61 is suitably secured to the upper side of the tongue, adjacent to its rear end, and this bracket has laterally projecting lips or flanges 62 adapted to strike the upper edges of the frame bars and thereby limit the upward tilting movement of the tongue. Such bracket serves as a limiting stop to prevent downward folding movement between the tongue and the frame 47 in the backing of the implement.

As shown in Figure 2, the frame bars 47a and 47b diverge laterally from the guide block 49 to effect attachment to the runner frame at points spaced relatively far apart. Bracing links or bars 63 reinforce the angle bends of the frame bars between the parallel portions and the diverging portions thereof. The rear ends of the diverging portions are bent into substantial parallelism and have such parallel ends rigidly bolted to the runner frame 12 by the bolts 64 and 65. The bolts 64, which pass through the extremity of the frame bars, have attachment to suitable lugs or brackets carried by the runner frame. The front bolts 65 pass through holes in the frame bars 47a and 47b and through holes in brackets 67 which are fixedly secured to the runner frame. Referring to Figure 1, it will be noted that each bracket 67 has a plurality of holes 68 for receiving the bolts 65. Three of such holes have been shown but it will be evident that a greater or lesser number may be provided if desired for a wider range of adjustment. The several holes are disposed on an arc having the rear bolt 64 as its center, and it will be evident that by releasing the two bolts 65 and changing their locations in the holes 68 the runner frame 12 can be tilted with respect to the wheel-supported frame 47. The purpose of such adjustment is to dispose the runner 13 and its shank 16 at the proper angle when in its lower operating positions to secure accurate registry between the buttons on the check wire and the points of deposit of the seed.

The front frame 47 is arranged to have vertical translational motion relative to its wheel support or standard 53, for securing the depth adjustments of the runners 13, and for raising the runners clear of the ground when the implement is to be transported to and from the field. Such shifting or translational motion is effected through a bell crank lever 69 which has pivotal connection with the frame 47 and with the wheel standard 53. The lever has pivotal connection with the frame through a pair of links 71, the upper ends of which are pivotally connected to opposite sides of the lever 69 on the pivot pin 72, and the lower ends of which diverge and have pivotal mounting on the opposite sides of the guide block 48, upon a pivot pin 73 extending through the block. The front end of the lever is provided with any suitable arrangement of fork arms 74 which embrace a thrust collar 75 on the upper end of the wheel standard 53, the arms 74 receiving pivot pins 76 which project from diametrically opposite sides of the thrust collar. The collar bears against a shoulder 77 on the wheel standard and is held against displacement from the upper end of the standard by the transverse pin 78. It will be noted that angular movement of the lever 69 is operative to raise or lower the frame 47 along the wheel standard 53, without interfering with the caster wheel rotation of the standard. The link mounting of the lever on the frame 47 accommodates the fore-and-aft swinging of the lever in this angular movement. Pivotally connected at 79 to the lower arm of the lever is a link 81 which extends rearwardly to the depth-adjusting lever 22 where it has pivotal connection therewith as at 82. It will hence be seen that with each actuation of the lever 22 the bell crank lever 69 will be oscillated to raise or lower the front frame 47, and, correspondingly, the link 33 will be raised or lowered for similarly moving the rear end of the runner frame 12. Figures 4 and 5 illustrate the path followed by the runners when moving between two working adjustments.

The draft of the implement is transmitted through an evener 84, which is pivotally supported on the front frame 47 and has its ends curved downwardly to support tug hooks 85 of any suitable type. As shown in Figure 3, the evener has a swiveled mounting on the under side of the guide block 49 upon a pivot bolt 86 extending downwardly through the guide block and through the evener. An arcuate plate 87 has its ends riveted or bolted to the evener on each side of the guide block and has its intermediate portion extending forwardly and slightly upwardly for bearing against the under side of the block in front of the wheel standard 53. Such arcuate plate 87 relieves the pivot bolt 86 of the twisting stresses set up in the evener, transferring such stresses through said plate to the guide block.

When winding up the check-wire upon the reel in this type of implement, the wire passes in close proximity to the tongue 57, and at such times it is possible that the wire will become fouled in the wheel 55 and its fork 54, or will become worn and damaged through striking the latter. To avoid this I have mounted a wire guide 88 on one side of the wheel fork 54, through which guide the wire passes back to the wire reel at the rear end of the implement. As shown in Figure 6, this wire guide consists of a looped or coiled rod, having its free end separated from the loop or coil and extending upwardly. Any intermediate portion of the checkwire can be easily inserted in the guide by merely slipping the same down past the free end of the rod and into the loop. One of the mounting sockets for the reel is indicated at 89, the same being driven from the wheel 11 by a chain 91.

Figures 4 and 5 are views in which the structure has been schematically illustrated to show the positions of the frames and of the pivots in the different working positions of the runners. It will be noted from Figure 4 that in lifting the furrow openers through actuation of the lever 22, the rear frame 8 is caused to tilt backwardly around its wheel axis 9, and the front frame 47 is caused to shift bodily upwards along the wheel standard 53. In the resulting hinge movement between the front and rear frames, the runners will partake of the motion of the front frame, moving upwardly with a rectilinear motion, or with the runner units maintaining the same angular relation to the surface of the ground. When moving the runners downwardly, represented by the position of the parts in Figure 5, the downward movement of the link 33 will permit the rear end of the front frame to move downwardly correspondingly with the downward movement of the front part of such frame along the standard 53. Hence, in their lower positions, represented in Figure 5, the runners are also in the same angular relation to the surface of the ground, as in their upper positions. The runners follow this characteristic rectilinear path in moving between each of their working adjustments. Thus at no point in the working range of adjustments are the runners inclined at an angle which would impair the accuracy of the check-row registration between the buttons on the check-wire and the points of deposit of the seed.

It will be obvious from the foregoing that the caster wheel 55 supports all of the tilting weight of the runners, runner frame, etc., so that none of this weight is transmitted to the neck yoke of the team. Moreover, the caster wheel supports the rear end of the tongue 57 and also relieves the team of this neck-yoke weight. It will also be obvious that the travel of the runners will be entirely independent of any change in the vertical angle of the tongue 57, the latter having free pivotal movement in the front frame 47.

While I have described what I consider to be a preferred embodiment of my invention, it will be understood that such embodiment is merely exemplary and that numerous modifications and rearrangements may be made without departing from the essence of the invention. For example, I consider it within the purview of the invention to so relate the pivots and to proportion the links and other operating parts, that the runners, in their working adjustments, will swing about a virtual pivot corresponding to the front end of the tongue, or to any other desired point, preferably spaced considerably from the runners so that the check-row registration will not be objectionably impaired.

Having thus described my invention what I claim as new and desire to obtain by Letters Patent of the United States, is:

1. In an agricultural implement, the combination of two frames, each wheel supported, means connecting said frames for relative pivotal movement, a furrow opener supported by one of said frames, and means including a lever pivoted on the other of said frames and operatively connected with said one frame for raising and lowering said latter frame and said furrow opener through an approximately rectilinear path in adjusting the working depth of the furrow opener.

2. In an agricultural implement, the combination of two frames, each wheel supported, means pivotally connecting said frames together at a point rearwardly of the wheel supporting the forward frame, a furrow opener carried by one of said frames, and means including a lever carried on one frame and link-connected at spaced points with the other frame for raising and lowering one of said frames through a rectilinear path thereby raising and lowering said furrow opener.

3. In an agricultural implement, the combination of front and rear frames, a supporting wheel for each frame, the supporting wheel for said front frame having lateral swinging movement, a tongue pivoted to said front frame, means pivotally connecting said frames together, a furrow opener carried by said front frame, and means including a lever mounted on the rear frame and connected with the front frame for raising and lowering said front frame bodily relative to its supporting wheel and thereby raising and lowering said furrow opener.

4. In a planter, the combination of two frames, a separate supporting wheel for each frame, means pivotally connecting said frames together, a furrow opener carried by one of said frames, and means including a lever mounted for pivotal movement on the other frame rearwardly of said one frame for adjusting the working depth of said furrow opener by shifting one of said frames bodily with rectilinear movement relative to its wheel axis and tilting the other of said frames relative to its wheel axis.

5. In a planter, the combination of front and rear frames, wheel means supporting each of said frames, one of said wheels having lateral steering movement, a tongue connected to said front frame, means pivotally connecting said frames together on an axis disposed intermediate the axes of said front and rear wheels, planter runners and seed hoppers, the latter being arranged to discharge into the furrows opened by said planter runners, carried by said front frame, and means for raising and lowering said front frame with a substantially vertical rectilinear motion relative to its supporting wheel for adjusting the furrow opening depth of said runners.

6. In an agricultural implement, the combination of a frame supported on two axially aligned wheels, a second frame pivotally connected to said first frame, a wheel standard on which said second frame is supported for vertical translational movement, a furrow opener carried by said second frame, and lever means having pivotal connection with said second frame and with said wheel standard for raising and lowering said second frame.

7. In an agricultural implement, the combination of front and rear frames, axially aligned wheels supporting said rear frame, a wheel standard on which said front frame is supported for vertical translational movement, means pivotally connecting said frames together intermediate the axes of the front and rear wheels, a furrow opener carried by said front frame, a lever pivotally connected with said wheel standard and with said front frame, for raising and lowering the latter relative to said standard, a link connected with the rear portion of said front frame, and a depth-adjusting lever mounted on one of said frames and having operative connection with said lever and said link.

8. In an agricultural implement, the combination of a rear frame, a pair of axially aligned wheels on which said frame is supported for tilting movement, a front frame, a caster wheel standard on which said front frame is slidably supported, means pivotally connecting said frames together intermediate the axes of the front and rear wheels, a furrow opener carried by said front frame, a bell crank lever pivotally connected with said front frame and said standard for raising and lowering said front frame, a link operatively connected with the rear portion of said front frame, and a depth-adjusting lever pivotally supported on said rear frame and operatively connected with said bell crank lever and with said link.

9. In a planter, the combination of a rear frame, a pair of axially aligned wheels on which said frame is tiltably supported, a front frame, a runner supporting frame rigidly secured to the rear portion of said front frame, means pivotally connecting said runner frame to said rear frame, a caster wheel having an upwardly extending standard, guide means on said front frame engaging over said standard, a tongue connected to said front frame, a swinging link pivotally mounted on said front frame, a bell crank lever supported on said link, a thrust collar connecting one arm of said bell crank lever with said standard, a rearwardly extending link connected to the other arm of said bell crank lever, a depth-adjusting lever mounted for latching engagement on said rear frame, said rearwardly extending link being operatively connected therewith, a link operatively connected between said depth-adjusting lever and said runner frame for positively lifting the latter frame, and a spring on said last named link for resiliently pressing said runner frame downwardly to the depth adjustment determined by said depth-adjusting lever.

10. In a planter, the combination of a front frame, a rear frame and a runner frame, front and rear wheels for said front and rear frames, means connecting said front and rear frames together for vertical pivotal movement, means adjustably securing said runner frame to said front frame whereby said latter frames can be adjusted angularly with respect to each other, a runner carried by said runner frame, and means for raising and lowering said front frame bodily relative to said front wheel for vertically adjusting said runner.

11. In a planter, the combination of a rear frame, a pair of axially alined wheels on which said frame is tiltably supported, a front frame, a runner supporting frame rigidly secured to the rear portion of said front frame, means pivotally connecting said runner frame to said rear frame, a caster wheel having an upwardly extending standard, guide means on said front frame engaging over said standard, a tongue connected to said front frame, a swinging link pivotally mounted on said front frame, a bell crank lever supported on said link, a thrust collar connecting one arm of said bell crank lever with said standard, a rearwardly extending link connected to the other arm of said bell crank lever, a depth-adjusting lever mounted for latching engagement on said rear frame, said rearwardly extending link being operatively connected therewith, and a link operatively connected between said depth-adjusting lever and said runner frame.

12. In a planter, the combination of a rear frame, a pair of axially alined wheels on which said frame is tiltably supported, a front frame, a runner supporting frame rigidly secured to the rear portion of said front frame, means pivotally connecting said runner frame with said rear frame, a caster wheel having an upwardly extending standard, guide means on said front frame engaging over such standard, a tongue pivotally connected to said front frame, a bell crank lever pivotally supported on said front frame, means connecting one arm of said bell crank lever with said standard, a rearwardly extending link connected to the other arm of said bell crank lever, a depth-adjusting lever mounted for latching engagement on said rear frame, said rearwardly extending link being operatively connected therewith, and a link operatively connected between said depth-adjusting lever and said runner frame.

13. In a planter, the combination of a rear frame, a pair of axially alined wheels on which said frame is tiltably supported, a front frame, a runner supporting frame, means adjustably securing said runner supporting frame to said front frame whereby said latter frames can be adjusted angularly in a vertical direction with respect to each other, means pivotally connecting said front and rear frames together, a caster wheel having an upwardly extending standard, guide means on said front frame engaging over said standard, a tongue pivotally connected to said front frame, a bell crank lever pivotally mounted on said front frame, means connecting one arm of said bell crank lever with said standard, a rearwardly extending link connected to the other arm of said bell crank lever, a depth-adjusting lever mounted for latching engagement on said rear frame, said rearwardly extending link being operatively connected therewith, and a link operatively connected between said depth adjusting lever and said runner frame.

14. An agricultural implement comprising, in combination, two frames pivotally connected together, soil working means carried by one of said frames, a wheel and wheel standard slidably supported by one of said frames, wheels supporting the other of said frames, and means for raising and lowering said one frame relative to said wheels through a rectilinear path.

15. An agricultural implement comprising, in combination, two frames pivotaly connected together, soil working means carried by one of said frames, means providing a vertical journal and mounted on said one frame, a wheel standard slidably supported in said journal means, a wheel near the lower end of the wheel standard, wheels supporting the other of said frames, and means for raising and lowering said one frame relative to said wheel standard.

16. An agricultural implement comprising, in combination, two frames pivotally connected together, soil working means carried by one of said frames, means providing a vertical journal and mounted on said one frame near the forward end thereof, a wheel standard slidable therein and having a supporting wheel, wheels supporting the other of said frames, and means for raising and lowering said one frame relative to the wheel standard and said other frame and including a lever pivoted on one of said frames near the pivot axis of the frames and having a link connection to the other frame, and means actuable by said lever to effect relative movement between said last mentioned other frame and said wheel standard.

17. A planter comprising, in combination, two frames pivotally connected together, one being connected at its rear end to the other, wheel means supporting each of said frames at points removed from the point of their pivotal connection, one of said frames being supported for generally vertical translational movement on the associated wheel means, and means operable to adjust the angular relationship between said pivoted frames and to adjust the position of said one frame relative to the associated wheel means by moving said one frame generally vertically in a rectilinear path, and a seed-receiving planter runner carried by said one frame and raised rectilinearly with the latter into and out of engagement with the ground.

18. In an agricultural implement, the combination of a seat frame and a runner frame, each wheel supported, means connecting said frames for relative pivotal movement, a furrow opener supported by said runner frame, and means including a lever pivoted on said seat frame and operatively connected at generally longitudinally spaced points to the runner frame for raising and lowering said latter frame and said furrow opener through an approximately rectilinear path in adjusting the working depth of the furrow opener.

19. In an agricultural implement, the combination of a seat frame and a runner frame, each wheel supported, means connecting said frames for relative pivotal movement, a furrow opener supported by said runner frame, a hand lever pivotally mounted on said seat frame, an arm on the lever, a generally downwardy extending link connecting the arm with the rear portion of said runner frame, and means connecting the lever with another portion of the runner frame for raising and lowering said latter frame and said furrow opener through an approximately rectilinear path in adjusting the working depth of the furrow opener.

20. In an agricultural implement, the combination of a seat frame and a runner frame, each wheel supported, means connecting said frames for relative pivotal movement, a furrow opener supported by said runner frame, a hand lever pivotally mounted on said seat frame, a first link extending generally downwardly and connecting the lever with the rear portion of the runner frame, means for raising and lowering the runner frame relative to its supporting wheel means, and a second link extending from said means to said lever, whereby operation of the latter raises and lowers the runner frame and said furrow opener through an approximately rectilinear path in adjusting the working depth of the furrow opener.

21. In an agricultural implement, the combination of a seat frame and a runner frame, a caster wheel connected with said runner frame so that the latter is capable of generally vertical movement relative to said caster wheel, wheel and axle means connected with the seat frame, means connecting said frames for relative pivotal movement, a furrow opener supported by said runner frame, a hand lever pivotally mounted on said seat frame, a second lever connected with said caster wheel means and said runner frame, a first link extending from said hand lever to said second lever, and a second link extending from said hand lever to the rear portion of said runner frame, whereby actuation of said hand lever raises and lowers said runner frame and said furrow opener through an approximately rectilinear path in adjusting the working depth of the furrow opener.

22. In an agricultural implement, the combination of a seat frame supported on two axially aligned wheels, a runner frame pivotally connected to said seat frame, a wheel standard connected with the runner frame so that the latter is capable of generally vertical translational movement relative to said wheel standard, a furrow opener carried by said runner frame, a hand lever fulcrumed on said seat frame, a second lever pivotally connected at an intermediate point with said runner frame and having one end connected with said wheel standard, a link connecting the other end of said second lever with said hand lever, and a second link connecting said hand lever with the rear portion of said runner frame, whereby actuation of said hand lever raises and lowers said runner frame and said furrow opener through an approximately rectilinear path in adjusting the working depth of the furrow opener.

23. In an agricultural implement, the combination of front and rear frames, axially aligned wheels supporting said rear frame, a wheel standard on which said front frame is supported for vertical translational movement, means pivotally connecting said frames together intermediate the axes of the front and rear wheels, a furrow opener carried by said front frame, a lever pivotally connected wtih said wheel standard and with said front frame for raising and lowering the latter relative to said standard, a link connected with the rear portion of said front frame, a depth adjusting lever mounted on said rear frame rearwardly of said pivotal connecting means between said frames and having an arm connected with said link, and link means connecting said depth-adjusting lever with said first-mentioned lever.

24. An agricultural implement comprising a seat frame comprising interconnected generally longitudinal and transverse frame bars, a transverse axle journaled on the intermediate portion of the seat frame, a tool frame having furrow opening means, means connecting said frames for relative pivotal movement, and means including a lever pivoted on said seat frame and operatively connected at generally longitudinally spaced points to the tool frame for raising and lowering said latter frame and said furrow opener through an approximately rectilinear path in adjusting the working depth of the furrow opener.

25. In an agricultural implement, the combination of a seat frame and a runner frame, each wheel supported, means connecting said frames for relative pivotal movement, a furrow opener supported by said runner frame, a depth adjusting lever pivoted on said seat frame, means serving as a bracket extending rearwardly from said runner frame, a link extending generally downwardly from said lever to said bracket means for raising the rear portion of said runner frame, and means extending from said lever to the wheel means of said runner frame for raising the front portion of the latter when the rear portion is raised.

26. An agricultural implement comprising a front frame, supporting wheel means therefor, a tool frame adjustably connected with said front frame, a rear frame, supporting wheels for the rear frame, means pivotally connecting said rear frame and tool frame for relative movement about a transverse axis for raising and lowering said tool frame in response to tilting movement of the rear frame about the axis of its supporting wheels, and means connected between the front frame and its supporting wheel means and with said rear frame for raising said tool frame with a substantially vertical movement.

27. An agricultural implement comprising, in combination, two frames pivotally connected together, one being connected at its rear end to the other, wheel means supporting each of said frames at points removed from the point of their pivotal connection, one of said wheel means being mounted so that the frame carried thereby is movable vertically relative to said one wheel means, means serving as a lever connected between said one wheel means and the associated frame, and a depth adjusting lever pivoted on the rear frame and having two link connections with the other frame and said one wheel means, said link connections being arranged whereby said depth adjusting lever is operable to adjust the angular relationship between said pivoted frames and to adjust the position, relative to said one wheel means, of the frame that is carried by said one wheel means so that one of said frames moves vertically in a rectilinear path.

CHARLES H. WHITE.